United States Patent
Hare et al.

(10) Patent No.: US 10,419,855 B2
(45) Date of Patent: Sep. 17, 2019

(54) COOLING FOR AUDIO APPLIANCES

(71) Applicant: Apple Inc., Cupertino, CA (US)

(72) Inventors: Joshua L. Hare, Sunnyvale, CA (US); Daniel C. Klingler, Mountain View, CA (US); Daniel S. Naito, Campbell, CA (US); Richard M. Powell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/827,642

(22) Filed: Nov. 30, 2017

(65) Prior Publication Data

US 2019/0166431 A1    May 30, 2019

(51) Int. Cl.
| | |
|---|---|
| *H04R 9/02* | (2006.01) |
| *G06F 1/3203* | (2019.01) |
| *G06F 1/20* | (2006.01) |
| *G11B 20/10* | (2006.01) |

(52) U.S. Cl.
CPC ............ *H04R 9/022* (2013.01); *G06F 1/206* (2013.01); *G06F 1/3203* (2013.01); *G11B 2020/10555* (2013.01)

(58) Field of Classification Search
CPC ....... H04R 9/022; G06F 1/206; G06F 1/3203; G11B 2020/10555
USPC .......................................................... 381/397
See application file for complete search history.

(56) References Cited

U.S. PATENT DOCUMENTS

| | | |
|---|---|---|
| 4,722,201 A | 2/1988 | Hofler et al. |
| 5,303,555 A | 4/1994 | Chrysler et al. |
| 5,701,358 A | 12/1997 | Larsen et al. |
| 5,901,556 A | 5/1999 | Hofler |
| 5,909,015 A | 6/1999 | Yamamoto et al. |
| 5,953,921 A | 9/1999 | Garrett |
| 6,059,020 A | 5/2000 | Jairazbhoy et al. |
| 6,373,957 B1 | 4/2002 | Stewart |
| 6,390,231 B1 | 5/2002 | Howze |
| 6,405,794 B1 | 6/2002 | Kim et al. |
| 6,535,613 B1 | 3/2003 | Ssutu |
| 6,549,637 B1 | 4/2003 | Risch |
| 6,639,993 B2 | 10/2003 | Kemmerer et al. |
| 6,678,387 B2 | 1/2004 | Kemmerer |
| 6,711,905 B2 | 3/2004 | Howard |
| 6,771,791 B2 | 8/2004 | Shelley et al. |
| 6,837,333 B2 * | 1/2005 | Howze .................. H04R 9/022 181/148 |

(Continued)

*Primary Examiner* — Sean H Nguyen
(74) *Attorney, Agent, or Firm* — Ganz Pollard, LLC

(57) ABSTRACT

An audio appliance includes an oscillatable diaphragm, a first heat-dissipation unit, a second heat-dissipation unit, and a control unit. The first heat-dissipation unit dissipates heat at a first rate and the second heat-dissipation unit dissipates heat at a second rate. The control unit can receive an indication of a temperature of the first heat-dissipation unit and an indication of a temperature of the second heat-dissipation unit. The control unit provides oscillation control of the oscillatable diaphragm to maintain the temperature of the first heat-dissipation unit below a first threshold and/or to maintain the temperature of the second heat-dissipation unit below a second threshold. The control unit can provide the oscillation control responsive to each of the indication of the temperature of the first heat-dissipation unit and the indication of the temperature of the second heat-dissipation unit exceeding a respective threshold.

20 Claims, 6 Drawing Sheets

(56) References Cited

U.S. PATENT DOCUMENTS

| | | |
|---|---|---|
| 7,062,921 B2 | 6/2006 | Jeng et al. |
| 7,263,837 B2 | 9/2007 | Smith |
| 7,278,271 B2 | 10/2007 | Chou et al. |
| 8,037,693 B2 | 10/2011 | Thurnau |
| 8,150,095 B2 | 4/2012 | Kemmerer |
| 8,371,129 B2 | 2/2013 | Aldraihem |
| 8,443,599 B2 | 5/2013 | Watanabe et al. |
| 8,447,053 B2 | 5/2013 | Tseng et al. |
| 9,092,204 B2 | 7/2015 | Chou et al. |
| 9,354,677 B2 | 5/2016 | Reilly et al. |
| 2007/0237351 A1 | 10/2007 | Hyde |
| 2008/0060364 A1 | 3/2008 | Watanabe et al. |
| 2008/0110180 A1 | 5/2008 | Watanabe et al. |
| 2008/0120981 A1 | 5/2008 | Dean et al. |
| 2009/0282838 A1 | 11/2009 | Thurnau |
| 2010/0064680 A1 | 3/2010 | Watanabe et al. |
| 2010/0303278 A1* | 12/2010 | Sahyoun ............... H04R 9/043 381/398 |
| 2012/0230499 A1* | 9/2012 | Suzuki ................. H04R 1/025 381/55 |
| 2013/0294639 A1* | 11/2013 | Glei neir ............... H04R 1/028 381/397 |
| 2016/0120059 A1* | 4/2016 | Shedd .................... H05K 7/208 165/244 |
| 2016/0177802 A1 | 6/2016 | Courtes |
| 2016/0219370 A1 | 7/2016 | Moro |
| 2016/0323673 A1* | 11/2016 | Peng ...................... H04R 9/06 |

\* cited by examiner

COOLING FOR AUDIO APPLIANCES

FIELD

This application and the subject matter disclosed herein, (collectively referred to as the "disclosure") generally concern cooling for audio appliances. More particularly, but not exclusively, this disclosure pertains to systems, methods, and components to cool one or more temperature-sensitive regions in an audio appliance. As but one illustrative example, an audio appliance can control oscillations of a woofer diaphragm to enhance cooling of one or more temperature-sensitive components of the audio appliance.

BACKGROUND INFORMATION

Users demand high-quality audio playback from audio appliances, as well as unimpaired rendering of near-field and far-field speech for telephony and speech-recognition tasks, and/or other features. In addition to loudspeaker and/or microphone transducers, known and proposed audio appliances incorporate various forms of amplification, power-delivery, processing, memory, and other circuitry and components that dissipate waste heat during operation.

If heat dissipated by a device is not absorbed by a surrounding environment at a rate equal to or higher than the rate of dissipation, the device's temperature increases. Nonetheless, reliable operation of many electrical components, and in particular, integrated electronic components, is often sensitive to temperature.

SUMMARY

In some respects, concepts disclosed herein generally concern cooling for audio appliances. Some disclosed concepts pertain to systems, methods, and components to cool one or more temperature-sensitive regions in an audio appliance. As but one example, some disclosed audio appliances control oscillations of a woofer or other diaphragm to enhance cooling of one or more temperature-sensitive components of the audio appliance while concurrently rendering a high-quality playback of audio or observing near-end audio (e.g., near-field or far-field speech).

Some audio appliances have an oscillatable diaphragm, a first heat-dissipation unit, and a second heat-dissipation unit. The first heat-dissipation unit dissipates heat at a first rate and the second heat-dissipation unit dissipates heat at a second rate. A control unit receives an indication of a temperature of the first heat-dissipation unit and an indication of a temperature of the second heat-dissipation unit. The control unit provides oscillation control of the oscillatable diaphragm to maintain the temperature of the first heat-dissipation unit below a first threshold and/or to maintain the temperature of the second heat-dissipation unit below a second threshold. The control unit provides the oscillation control responsive to each of the indication of the temperature of the first heat-dissipation unit and the indication of the temperature of the second heat-dissipation unit exceeding a respective threshold.

In some aspects, the first heat-dissipation unit comprises a power unit to provide power to drive the oscillatable diaphragm. The second heat-dissipation unit can be a logic component.

The indication of the temperature of the first heat-dissipation unit can be an indication of a temperature of the power unit. The indication of the temperature of the second heat-dissipation unit can be an indication of a temperature of the logic component.

The oscillation control provided by the control unit can cause and adjustment to one or both of an oscillation frequency and an oscillation amplitude of the oscillatable diaphragm. In some instances, the adjustment reduces a thermal resistance between the power unit and an adjacent fluid compared to a thermal resistance between the power unit and the adjacent fluid prior to the adjustment. In some instances, the adjustment reduces a thermal resistance between the logic component and an adjacent fluid compared to a thermal resistance between the logic component and the adjacent fluid prior to the adjustment. In some instances, the adjustment reduces a power dissipation of the power unit compared to a power dissipation of the power unit prior to the adjustment, thereby to maintain the temperature of the power unit below the first threshold.

Some audio appliances include an oscillator to receive one or both of an amplitude output and a frequency output from the control unit. The oscillator can output a drive signal to control a flow of the fluid adjacent the first heat-dissipation unit, the second heat-dissipation unit, or both.

The oscillator can be a low-frequency oscillator. The oscillation control provided by the control unit can be received by the low-frequency oscillator, and the low-frequency oscillator can output a signal to oscillate the diaphragm at a frequency within a sub-acoustic frequency band. Such oscillations can urge convective fluid movement adjacent the first heat-dissipation unit, the second heat-dissipation unit, or both. Thus, the oscillations can be responsive to the oscillation control provided by the control unit.

The audio appliance can combine the output signal from the low-frequency oscillator with an audio signal to oscillate the diaphragm at a frequency within an audible frequency band. Thus, the audio appliance can playback desired audio and urge convective fluid movement adjacent the first heat-dissipation unit, the second heat-dissipation unit, or both.

In some audio appliances, the indication of temperature of the power unit can correspond to one or more of an output from a temperature sensor, a measure of expected or observed power dissipation by the power unit corresponding to an audio signal received by the control unit, and a measure of expected or observed power dissipation by the power unit corresponding to the oscillation-control provided by the control unit. The indication of temperature can correspond to any of a measure of expected or observed diaphragm movement corresponding to an incoming audio signal, a measure of expected or observed diaphragm movement corresponding to the oscillation control provided by the control unit, a measure of expected or observed power dissipation by the logic component, a measure of expected or observed computational load on the logic component, and a measure of data-transfer rate to, from or through the logic component.

The indication of temperature of the logic component can correspond to one or more of an output from a temperature sensor, a measure of expected or observed power dissipation by the power unit, a measure of expected or observed power dissipation by the logic component, a measure of expected or observed diaphragm movement corresponding to an audio signal received by the control unit, a measure of expected or observed diaphragm movement corresponding to the oscillation control provided by the control unit, a measure of a computational load on the logic component, and a measure of data-transfer rate to, from or through the logic component.

Methods of cooling an audio appliance also are disclosed. For example, an oscillation-control output can be provided to control oscillations of an oscillatable diaphragm. The oscillation-control output can be responsive to an indication of a temperature of a first heat-dissipation unit and an indication of a temperature of a second heat-dissipation unit. The oscillatable diaphragm can be driven to oscillate in correspondence with the oscillation-control output to urge a fluid to move adjacent the first heat-dissipation unit, the second heat-dissipation unit, or both. The oscillatable diaphragm can be oscillated within a sub-acoustic frequency band.

The oscillation-control output can be combined with an audio signal. The oscillatable diaphragm can be oscillated according to the combined oscillation-control output and audio signal.

In some instances, the oscillation control output includes an oscillation-control signal having a frequency in a sub-acoustic frequency band and can be combined with the audio signal. The act of oscillating the oscillatable diaphragm can include playback of the audio signal in an audible frequency range.

Some audio appliances include a loudspeaker having a diaphragm, a power supply unit to power the loudspeaker; and a processor and a memory. The memory can store instructions that, when executed by the processor, cause the audio appliance to drive the diaphragm through an oscillatory movement responsive to an audio signal and to an indication of one or both of a temperature of the processor and a temperature of the power supply unit. The driven diaphragm can urge a fluid to flow past the respective one or both of the processor and the power supply unit.

In some embodiments, the oscillatory movement includes an oscillation component having a frequency between about 5 Hz and about 20 Hz. In some embodiments, the instructions, when executed by the processor, further cause the audio appliance to adjust the oscillatory movement of the diaphragm responsive to an indication of the temperature of the power supply unit exceeding a threshold temperature.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

The following describes various principles related to cooling of audio appliances and one or more temperature-sensitive regions thereof. For example, certain aspects of disclosed principles pertain to controlling oscillations of a woofer diaphragm to enhance cooling of one or more temperature-sensitive components in an audio appliance. That said, descriptions herein of specific apparatus configurations and combinations of method acts are but particular examples of contemplated systems chosen as being convenient illustrative examples of disclosed principles. One or more of the disclosed principles can be incorporated in various other audio systems to achieve any of a variety of corresponding system characteristics.

Thus, systems having attributes that are different from those specific examples discussed herein can embody one or more presently disclosed principles, and can be used in applications not described herein in detail. Accordingly, such alternative embodiments also fall within the scope of this disclosure.

I. OVERVIEW

Conventionally, heat sinks and other structures for increasing an area available for heat transfer from electrical components have been used alone or in combination with one or more fans and/or ductwork to remove heat dissipated by such electrical components. However, conventional cooling approaches can be unsuitable for some audio appliances, as such conventional approaches can degrade perceived audio quality during playback, as well as impair near-field and far-field speech observed by a microphone transducer.

Accordingly, an approach to cool an audio appliance with little or no impairment to audio playback or speech observation is needed. As well, systems, methods, and components to cool one or more temperature-sensitive areas in an audio appliance are needed. Further, a need exists for augmented cooling of one or more temperature-sensitive regions of an audio appliance. The principles disclosed herein overcome many problems in the prior art and address one or more of the aforementioned or other needs.

Figure 1:
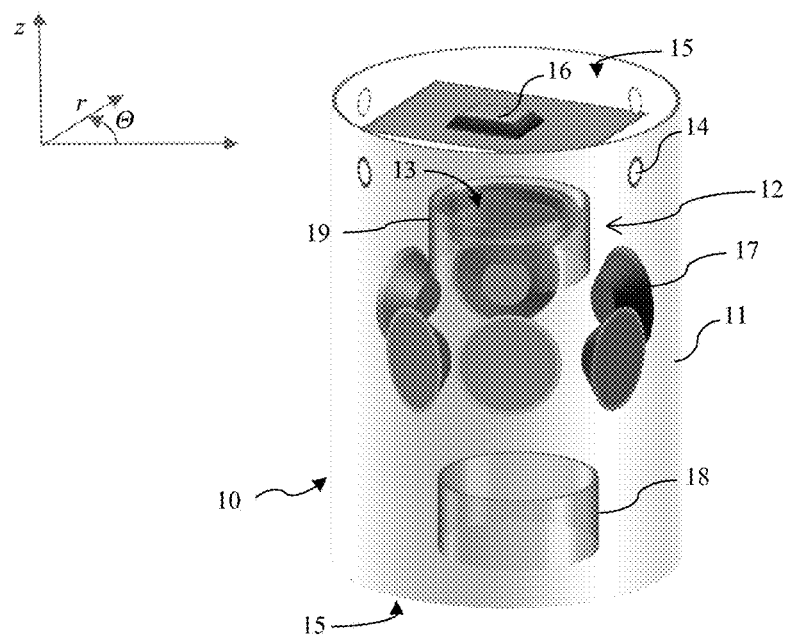
FIG. 1 illustrates an embodiment of an audio appliance.

Disclosed audio appliances provide high-fidelity playback (e.g., high dynamic range) over a wide range of sound pressure levels (SPL), and can carry out a variety of commands uttered by a user. As shown in FIG. 1, an audio appliance 10 can incorporate one or more loudspeaker transducers 12 (e.g., FIG. 2) to playback audio and one or more microphone transducers 14 to convert environmental sound to a corresponding electrical signal. The audio appliance 10 also includes one or more logic components 16 and one or more power units 18 to provide power to the audio appliance and its constituent devices, each of which is referred to herein, generally, as a "heat-dissipation unit". As used herein, the term "heat-dissipation unit" refers to a device, a component, an assembly of components, a transducer, a logic board interconnecting a plurality of components, an integrated circuit, or any other article of manufacture that dissipates waste-heat during normal operation.

Figure 2:
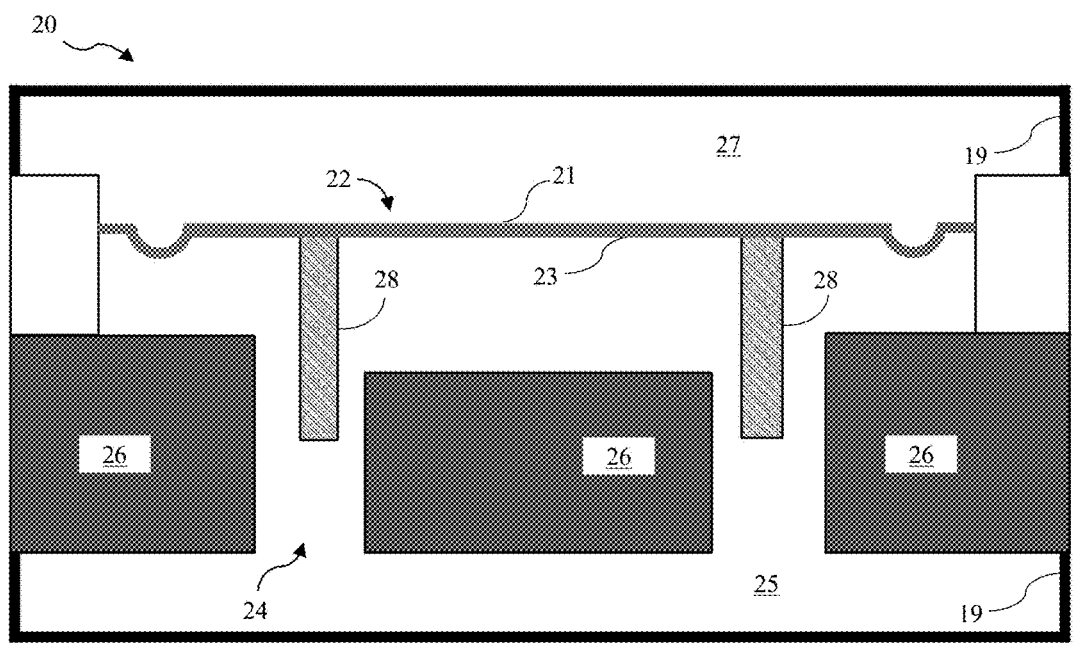
FIG. 2 schematically illustrates a loudspeaker transducer.

As shown in FIG. 2, a loudspeaker 20 can have a diaphragm 22 that oscillates during audio playback. For example, the loudspeaker 20 can receive a drive signal (e.g., drive signal 59 in FIG. 7) and the diaphragm 22 can oscillate in response to the drive signal. Typically, the diaphragm 22 oscillates within a selected range of amplitudes (sometimes also referred to as "excursions") at a frequency in an audible frequency band. The audible frequency band is generally taken in the art to be between about 20 Hz and about 20 kHz. Additionally or alternatively, the diaphragm 22 can oscillate in a sub-acoustic frequency band, e.g., at or below about 20 Hz, such as less than about 15 Hz, with between about 5 Hz and about 10 Hz being but one particular sub-acoustic frequency band.

As the diaphragm 22 oscillates, it can urge a nearby working fluid 31 (FIG. 3), typically air, to move within, around, and/or through the audio appliance 10. Such fluid movement 30a, 30b can take the form of an oscillatory fluid flow, a continuous flow, or a pulsating flow, each according to a selected arrangement of ducts, passageways and valves included in a given audio appliance.

During operation of the audio appliance 10, one or more heat-dissipation units 16, 18 can dissipate waste heat. Each component's temperature typically will increase if it dissipates heat at a faster rate than the heat can be removed from the component. Likewise, the component's temperature typically will decrease as heat is removed from the component faster than it is dissipated by the component. (By way of clarification, the terms "heat" or "heat dissipation" refer to a measure of energy, whereas the terms "power" and "rate of heat dissipation" refer to a measure of energy per unit of time.)

Further, reliability of some heat-dissipation units can deteriorate if a temperature of the heat-dissipation unit exceeds a threshold temperature. Thus, to maintain reliable device operation, augmented cooling may be desirable in some audio appliances. Such augmented cooling can remove waste heat from a heat-dissipation unit at a sufficient rate as to maintain the unit's temperature at or below an upper threshold temperature for long-term, reliable operation.

In one aspect, cooling of (i.e., removal of heat from) one or more heat-dissipation units 16, 18 can be augmented by fluid movement induced by oscillations of the loudspeaker diaphragm 13 (FIG. 1). And, the amount of cooling augmentation provided can vary according to oscillation frequency and amplitude. In many instances, however, oscillating a diaphragm can improve heat transfer rates from, and can provide additional operating headroom for, one or more heat-dissipation components.

Figure 4:
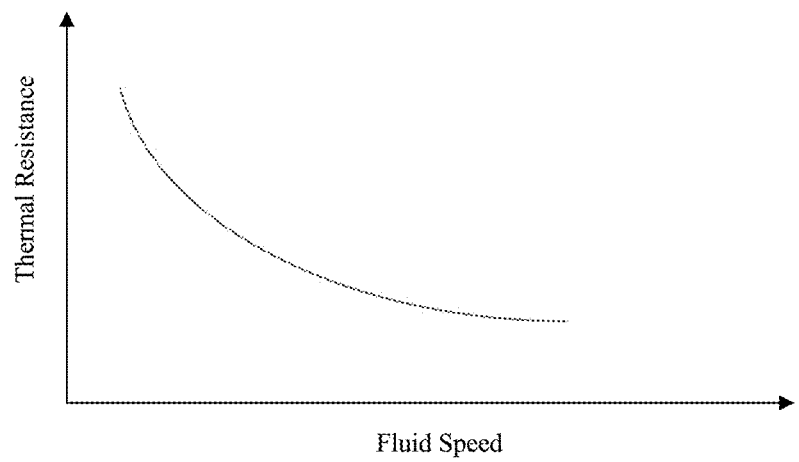
FIG. 4 shows a representation of variation in thermal resistance with fluid speed indicative of a fluid flow.
Figure 5:
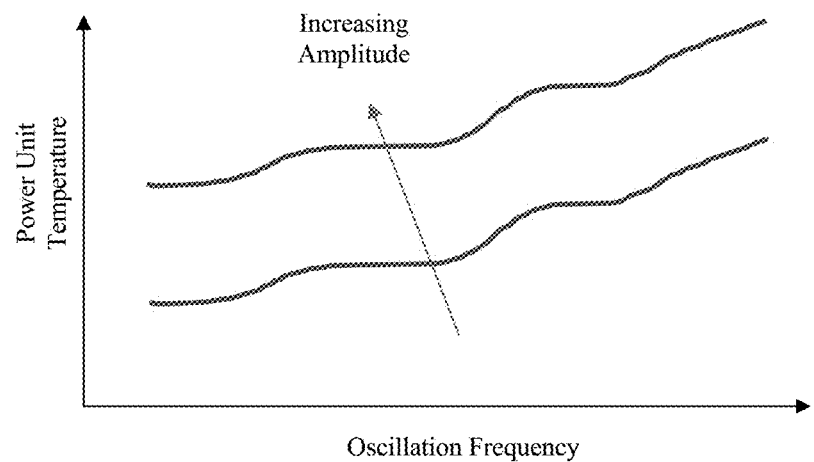
FIG. 5 schematically illustrates an example of variation in temperature of a power unit to drive an oscillatable diaphragm with frequency and amplitude of diaphragm oscillations.
Figure 6:
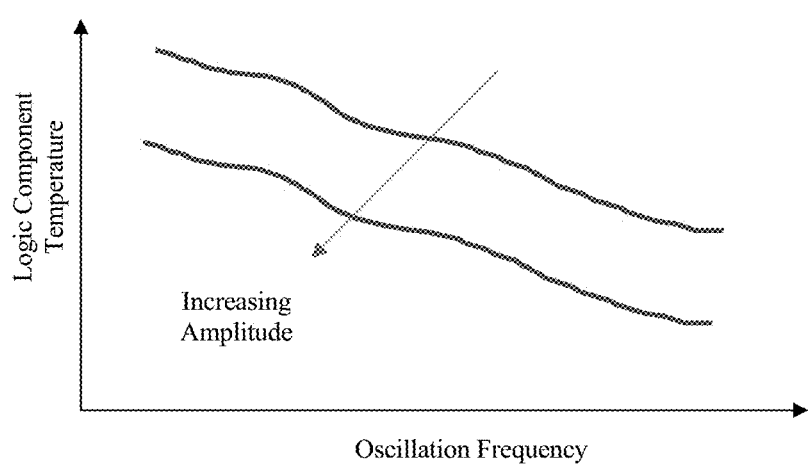
FIG. 6 schematically illustrates an example of variation in temperature of a logic component with frequency and amplitude of diaphragm oscillations.

FIG. 4 shows a decay of thermal resistance with increasing airflow 30a, 30b, and FIGS. 5 and 6 illustrate combined effects on device temperature by virtue of power dissipation and heat removal variations arising under various oscillation frequencies and amplitudes in a given embodiment of an audio appliance. Waste-heat is typically dissipated by an amplifier or other power unit used to drive the diaphragm. And, a rate of heat dissipated by the power unit 18 used to drive the loudspeaker diaphragm 13 can change across frequency bands and excursion ranges, in part due to variations in loudspeaker efficiency variations with frequency and/or excursion, as well as a resonant-frequency of the audio-appliance enclosure 11.

In some instances, driving the diaphragm 13 to induce or augment cooling of one heat-dissipation unit can increase the rate of heat dissipation within the audio appliance 10, e.g., compared to when the diaphragm is not driven to oscillate. And, driving the diaphragm 13 to augment convective-heat-transfer mechanisms can cause the power unit 18 to dissipate more power than, for example, during playback of only an audio signal. Further, driving the diaphragm sufficiently to augment convective heat-transfer mechanisms can, in some circumstances, cause a heat-dissipation unit to dissipate waste heat at a higher rate than the augmented fluid flow can remove it.

Thus, under some operating conditions, a temperature of a given heat-dissipation unit might not decrease by virtue of driving the diaphragm 13 to oscillate, despite that another heat-dissipation unit's temperature could decrease. Indeed, the temperature of one heat-dissipation component could increase from driving a diaphragm in an attempt to augment cooling of that or another heat-dissipation unit (as shown for example in FIGS. 5 and 6). Accordingly, responsive to driving the loudspeaker diaphragm 13 to oscillate, a temperature of a given heat-dissipation unit (e.g., a power unit, a logic component) can increase or decrease in response to the combined effects of power dissipation by the heat-dissipation unit, power dissipation by another heat-dissipation unit, and rate of heat removal from the heat-dissipation unit due to an augmented fluid flow. In some instances, a particular heat-dissipation unit's temperature can increase even when a temperature of another heat-dissipation unit decreases, and vice-versa. In some instances, combined effects of power dissipation and heat removal result in a net lower temperature for all heat-dissipation units.

Generally, the rate of heat dissipation by a given heat-dissipation unit typically corresponds to a load applied to the heat-dissipation unit and physical characteristics of the heat-dissipation unit, as well as an environment in which the heat-dissipation unit is installed. Thus, an achievable rate of heat removal from the power unit 18 typically corresponds to physical characteristics of the power unit, physical characteristics of the audio appliance 10 in which the power unit resides, a degree to which fluid flow may be augmented (or forced by a fluid mover e.g., diaphragm 13), and a load applied to the audio appliance.

Some disclosed audio appliances 10 incorporate control logic 50 (FIG. 7) to control a temperature of each in a plurality of heat-dissipation units. For example, a control unit 52 can control oscillations of the diaphragm 13 to balance benefits of augmented heat-transfer mechanisms against a potential net-increase in temperature of one or more of the heat-dissipation units. Such a net-increase in temperature can arise from a marginal increase in power dissipation by a given heat-dissipation unit being greater than a marginal increase in rate of heat removal from the heat-dissipation unit.

The control unit 52 can reduce a likelihood of overshooting a selected threshold temperature. For example, the control unit 52 can select an amplitude and/or a frequency of the diaphragm's oscillations to achieve a desired cooling rate for, and temperature of, each heat-dissipation unit, including during audio playback. The selected frequency can be within a sub-acoustic frequency band (e.g., between about 5 Hz and about 20 Hz).

Figure 7:
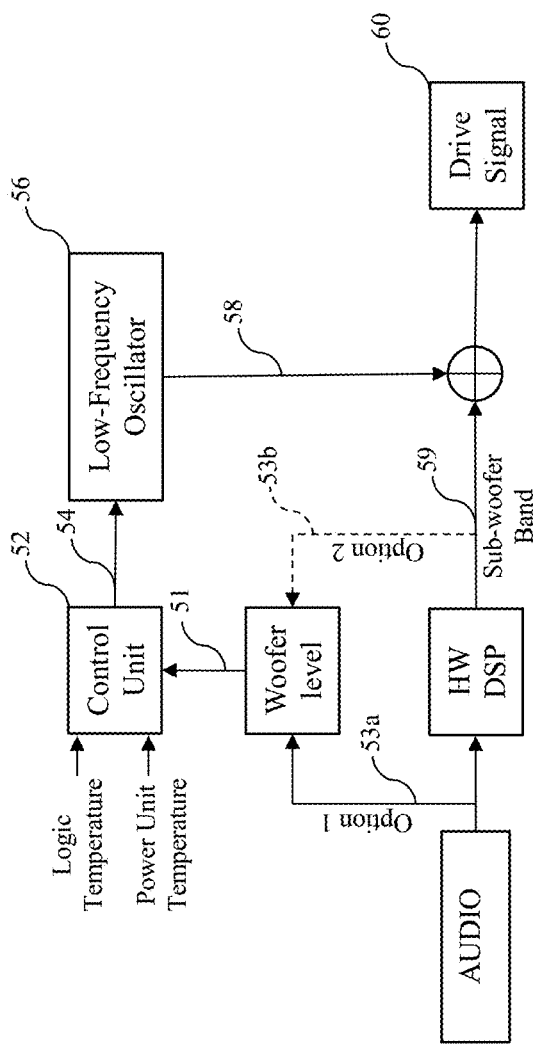
FIG. 7 illustrates a schematic block diagram of control logic to augment cooling in an audio appliance.

For example, as shown in FIG. 7, a control unit 52 can receive an indication (e.g., estimation or measurement) of temperature of one or more heat-dissipation units 16, 18. In response to the temperature information, the control unit 52 can output a frequency and/or an amplitude control signal to cause the diaphragm 13 to oscillate in a manner contemplated to augment cooling of one or more heat-dissipation units. The control unit 52 can account for marginal changes in power dissipation by, and heat-transfer rates to or from, each heat-dissipation unit of interest arising from driving the diaphragm 13.

Further details of disclosed principles are set forth below. Section II describes principles related to audio appliances by way of reference to FIG. 1. Section III describes principles pertaining to convective heat-transfer, and Section IV describes principles related to heat-dissipation units in audio appliances. Section V discloses principles relating to control logic to control oscillations of a loudspeaker diaphragm. And, Section VI discloses principles related to computing environments suitable for implementing disclosed thermal-management and/or control technologies.

Other, related principles also are disclosed. For example, the following describes machine-readable media containing instructions that, when executed, cause a processor of, e.g., a computing environment, to perform one or more disclosed methods. Such instructions can be embedded in software, firmware, or hardware. In addition, disclosed methods and techniques can be carried out in a variety of forms of processor or controller, as in software, firmware, or hardware.

II. AUDIO APPLIANCES

FIG. 1 shows an audio appliance 10 and a corresponding loudspeaker cabinet 11. The cabinet 12 houses one or more loudspeaker transducers 12, a logic component 16, and a power unit 18 to power at least one of the loudspeaker transducers. In FIG. 1, the cabinet 11 has a generally cylindrical shape defining a central, longitudinal axis z arranged perpendicularly to the opposed ends 15 of the cylindrical cabinet.

Each loudspeaker transducer 12 may be an electrodynamic or other type of driver that may be specially designed for sound output at particular frequency bands, such as a subwoofer, tweeter, or midrange driver, for example. In any event, each loudspeaker transducer herein can be considered an electric-to-acoustic transducer.

Referring to FIG. 2, a loudspeaker transducer 20 of the type 12 shown in FIG. 1 can include a diaphragm 22 and circuitry to urge the diaphragm to oscillate within a selected frequency band and through a range of excursions to produce sound output in response to an incoming acoustic signal. The circuitry can include a variety of electro-mechanical actuators to urge the diaphragm to oscillate. For example, some drivers incorporate a linear motor 24 having a permanent magnet 26 adjacent a voice-coil 28 physically coupled with the diaphragm 22. As electric currents pass in alternate directions through the voice-coil 28, corresponding magnetic fields interact with the magnetic field of the permanent magnet 26 to urge the voice-coil 28 and, by virtue of the physical coupling, the diaphragm 22 to oscillate to and fro. Other forms of actuators to urge a diaphragm to oscillate include, for example, ribbon drivers, piezoelectric actuators and electrostatic drivers. As well, waste-heat can be dissipated by the diaphragm motor (e.g., voice coils) in correspondence with the power used to drive the diaphragm 22.

Referring again to FIG. 1, positioned within the cabinet 11, one loudspeaker transducer 12 to playback audio in a bass and/or a sub-bass frequency band has a longitudinal axis aligned parallel to the longitudinal axis, z, of the enclosure 11. Other loudspeaker transducers 17 in the audio appliance 10 may be arranged side-by-side and circumferentially distributed around the central longitudinal axis of the cabinet 11. Although the audio appliance 10 is shown with one central loudspeaker 12, an audio appliance is not so limited and can incorporate a plurality of such transducers.

As also shown in FIG. 1, an audio appliance 10 can also incorporate an array of individual microphone transducers 14. The microphone transducers 14 can observe environmental sounds (e.g., near-field and far-field speech) by converting incident acoustic energy to one or more electric signals to be used with, for example, telephony and/or automatic speech recognition applications.

In FIG. 1, the housing (sometimes also referred to as a "cabinet") 11 houses a loudspeaker transducer 12. A loudspeaker enclosure 19 can define an enclosed rear chamber for the loudspeaker transducer 12, as in FIG. 1. In one aspect, the enclosure 19 may be a smaller volume confined inside the cabinet 11, or it could be "open" to the full extent of the available internal volume of the loudspeaker cabinet 11.

The enclosure 19 can be acoustically "sealed" and can define a back volume (rear chamber) 25 (FIG. 2) around a backside 23 (FIG. 2) of the diaphragm 13 of the transducer 12. As used herein, the term "sealed" means the back volume does not appreciably transfer (in an audible frequency band) sound waves produced by the back side 23 of the diaphragm 22 to the outside of the enclosure 19 or to the outside of the loudspeaker cabinet 11. Such an enclosure 19 can reduce a likelihood of front sound waves interfering with back sound waves, in an audible frequency band. Nonetheless, the enclosure 19 and housing 11 can be vented or ported to permit airflow, including pressure waves in a sub-acoustic frequency band.

In some audio appliances, a front-volume chamber 27 (FIG. 2) can be positioned around a front side 21 (FIG. 2) of the diaphragm 13 of the transducer 12. Front sound waves can exit the housing 19 or cabinet 11. In one embodiment, the enclosure 19 may have dimensions that are smaller than the wavelengths produced by the transducer.

Although a rear chamber and/or a front chamber, or other enclosure, may be acoustically "sealed" within audible frequency bands, neither chamber need be hermetically sealed. For instance, the enclosure 19 can have one or more vents or apertures having a sufficiently open cross-sectional area as to permit a flow of fluid to pass therethrough as the diaphragm oscillates in a sub-acoustic frequency band, and yet have a sufficient acoustic impedance as to impede or altogether prevent pressure waves in an audible frequency band to pass therethrough.

Figure 3:
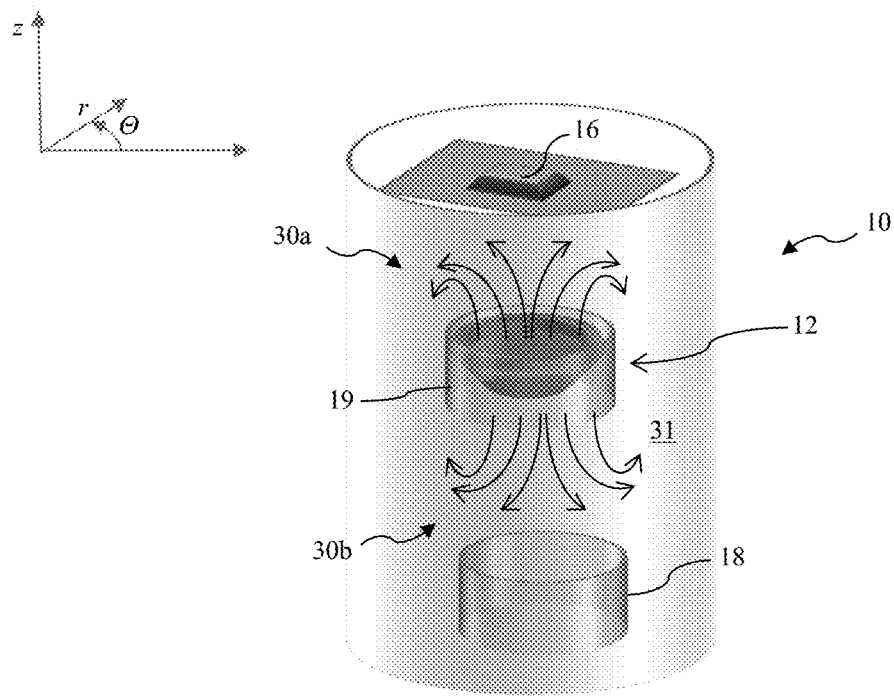
FIG. 3 schematically illustrates airflow throughout the audio appliance shown in FIG. 1 by virtue of loudspeaker-diaphragm oscillations.

Consequently, as shown schematically in FIG. 3, oscillations of the diaphragm 13 of the transducer 12 can induce a flow 30a, 30b of air or other environmental fluid to augment cooling of one or more heat-dissipation units 16, 18 in the audio appliance 10. For example, oscillations of the diaphragm 13 can urge movement 30a of air adjacent the logic component 16 and/or movement 30b of air adjacent the power unit 18. Persons skilled in the art will appreciate that some disclosed audio appliances include other heat-dissipation units, and diaphragm oscillations can urge movement of air adjacent those other heat-dissipation units.

Persons skilled in the art will also appreciate that the arrangement of the housing 11 and/or constituent components of the audio appliance 10 can differ from what is shown. For example, other embodiments of a loudspeaker cabinet 12 have a shape other than a cylinder. For example, some loudspeaker cabinets can be arranged as, e.g., a triangular, rectangular, pentagonal, or other general prismatic structure, a tetrahedral structure, a spherical structure, an ellipsoidal structure, a toroidal structure, or as any other desired three-dimensional shape. As well, one or more loudspeaker transducers can be positioned in arrangements other than being distributed about the enclosure 11 as described above. For example, some audio appliances arrange a plurality of loudspeaker transducers in one or more rows, as in the style of a sound bar.

III. CONVECTIVE HEAT TRANSFER

Correspondence between (1) a rate of heat transfer from a heat-dissipation unit to a nearby fluid; and (2) a temperature gradient between the respective unit and the fluid, can be quantified using a measure referred to in the art as a "thermal resistance." The concept of a thermal resistance is analogous to an electrical resistance, where a temperature gradient is analogous to a voltage potential across an electrically resistive element, and a rate of heat transfer is analogous to an electrical current through the resistive element.

Thermal resistance from a heat-dissipation unit to a nearby fluid corresponds to the environment in which the heat-dissipation unit operates. An apparent thermal resistance also can be influenced by nearby heat-dissipation units (e.g., that heat a nearby fluid or that may have some degree of thermal coupling with each other, as through a printed logic board). In general, thermal resistance from a heat dissipation unit decays with increasing speed of a nearby fluid flow, as indicated in FIG. 4.

A difference in temperature between a heat-dissipation unit 16, 18 and a nearby fluid, e.g., air, 31 can induce so-called "natural convection" and enhance removal of heat from the heat-dissipation unit compared to purely conductive heat-transfer from the unit to the fluid 31. Thus, a thermal resistance between a heat dissipation unit 16, 18 and the nearby fluid 31 is lower with natural convection compared to a thermal-resistance with conduction alone.

Convective heat-transfer can be considered as a combination of two heat-transfer mechanisms: (1) conductive heat-transfer from the heat-dissipation unit 16, 18 to the nearby fluid 31; and (2) so-called "advection." The term "advection" refers to displacement of heated fluid adjacent a fluid boundary (e.g., a heat-dissipation unit 16, 18) by cooler fluid from a region spaced away from the fluid boundary. Advection arises from differences in fluid density which occur by virtue of, e.g., differences in temperature throughout the fluid. The density variation results in differential, e.g., gravitational, forces throughout the fluid, which in turn cause movement within the fluid.

With advection, the fluid movement 30*a*, 30*b* carries heated fluid (and absorbed heat from the heat-dissipation units 16, 18) away from each respective heat-dissipation unit and replaces the heated fluid with cooler, unheated fluid. The temperature gradient between the fluid boundary (e.g., the heat-dissipation unit 16, 18) and the cooler fluid 31 at the fluid boundary promotes further conductive heat-transfer from the unit 16, 18 to the fluid 31. After displacement from the heat-dissipation unit, the heated fluid can reject heat, as to an ambient environment, to cool the fluid before it again flows near a heat-dissipation unit to absorb and to carry away additional heat.

Nonetheless, a rate of heat removal through natural convection is limited for a given heat-dissipation unit 16, 18. For example, each unit has an upper threshold temperature based on material and/or operational reliability considerations, and fluids have a finite temperature. A difference between the device's upper threshold temperature and a representative lower threshold temperature of a nearby fluid is sometimes referred to in the art as an "upper-threshold temperature gradient." With a finite, upper-threshold temperature gradient, density variations, and thus differential forces applied to, a given fluid are limited. Consequently, advective heat-transfer mechanisms are also limited, in turn limiting the rate at which heat can be rejected from a heat-dissipation unit to a fluid, under a given upper-threshold temperature gradient. Thus, a threshold thermal resistance can correspond to a given upper-threshold temperature gradient.

That said, fluid movement induced by natural-convection mechanisms can be augmented, as by oscillations of a loud-speaker diaphragm, to reduce a thermal resistance below the threshold thermal resistance corresponding to a given upper-threshold temperature gradient. Thus, augmented fluid movement can increase a rate at which heat may be removed from a heat-dissipation unit under a given upper-threshold temperature gradient, as the augmented fluid movement increases advective mechanisms. Stated differently, forced-convection-heat-transfer mechanisms can remove heat at a higher rate than naturally occurring convective-heat-transfer mechanisms. Consequently, a measure of thermal resistance typically is lower with an augmented fluid flow 30*a*, 30*b* (e.g., forced convection) than with natural convection alone. Nonetheless, as shown in FIG. 4, attainable, marginal improvements in thermal-resistance (or increased heat-transfer per unit area) decay as fluid-speed increases.

IV. HEAT-DISSIPATION UNITS

As noted above, disclosed audio appliances can include one or more heat-dissipation units. Representative examples of heat-dissipation units incorporated in disclosed audio appliances include loudspeaker transducers, microphone transducers, logic components, output devices, ornamental devices, and power units. As used herein, the term "power unit" refers to a device, a component, a circuit, or a combination thereof, to provide power to one or more transducers, components or other units in a disclosed audio appliance. A power unit is but one type of heat-dissipation unit. Other examples of heat-dissipation units include, by way of example, physical processors as described below in connection with computing environments, chipsets, graphics processors, audio processors, memory devices, light-emitting-diodes (LEDs), and other temperature-sensitive components that dissipate waste heat.

Many heat-dissipation units include one or more regions sensitive to temperature. For example, a transistor's operation may become unreliable at elevated temperatures and may cause a logic component to lose data if its temperature exceeds a given threshold temperature. Similarly, a power unit can temporarily or catastrophically fail if its temperature exceeds a corresponding upper threshold temperature. Thus, heat dissipation units, in general, have an upper threshold temperature in correspondence to their type, desired reliability, etc.

A temperature of a heat-dissipation unit can be inferred from an output of a temperature sensor, a mathematical model, or both. In general, a temperature of a given heat-dissipation unit can correspond to the characteristics to which the unit's rate of heat dissipation corresponds, as well as to an in situ environment on which thermal resistance depends and an ambient or other reference temperature. For example, if power dissipation and so-called thermal-resistance between a temperature-sensitive region and an ambient environment are known for a given heat-dissipation unit in a given environment, the unit's excess temperature above a so-called ambient (or other reference) temperature can be determined or estimated. Alternatively, a temperature of a heat-dissipation unit can be observed directly or indirectly, as with a temperature sensor in a semi-conductor die or a sensor mounted to thermally couple therewith.

Measuring power dissipation of a heat-dissipation unit can be difficult. However, estimating power dissipation from other, more easily measured parameters, can be relatively straightforward. For example, a rate at which waste heat is dissipated by a power unit used to drive a known loudspeaker can correspond to a drive signal, a level of amplification of the drive signal, and impedance characteristics of the loudspeaker. As discussed more fully below in connection with disclosed control units, the drive signal can include an audio signal, an oscillation signal output by a control unit, or a combination thereof. In some instances, a rate at which waste-heat is generated by the power unit further corresponds to a computational or other load on a logic component (e.g., a data-transfer rate) powered by the power unit. In such circumstances, the temperature of the power unit further can correspond to the computational or other load on the logic component. Accordingly, a power dissipated by a power unit can be estimated from observations of data throughput, computational load, and other measures of load on a logic component, and/or from observations of, for example, a signal used to drive a loudspeaker transducer. And, such loads can be observed or determined during operation of an audio appliance, allowing a power dissipated by the power unit to be inferred or determined indirectly during operation.

As indicated above and shown in FIG. 4, the so-called thermal resistance between a given heat-dissipation unit and a local ambient environment can decrease as fluid movement is augmented by diaphragm oscillations. And, thermal-resistance between the power unit and an environment can correspond to a variety of parameters, including the drive signal, a level of amplification of the drive signal, and impedance characteristics of the loudspeaker insofar as fluid flow adjacent the power unit corresponds to those parameters. Such correspondence can be observed or determined experimentally, and can be stored in a memory, e.g., in a look-up table or with curve-fit data.

Accordingly, a temperature of the power unit incorporated in a given audio appliance can be inferred from thermal-resistance data, a reference temperature in the audio appliance and observation of one or more of the drive signal, the level of amplification, and impedance characteristics of the loudspeaker. And, thermal-resistance can correspond to drive signal and amplification level. Such correspondence can be stored in a memory, as in a look-up table or in the form of stored coefficients for a curve fit of experimental data.

Accordingly, a temperature of the power unit can be estimated from an estimate of thermal resistance (taking into account, for example, effects of augmented airflow), an estimate of power as just described, and an observed or estimated ambient temperature. Thus, a temperature of the power unit can be indicated by an output from a temperature sensor, a measure of expected or observed power dissipation by the power unit in correspondence with an audio signal received by the control unit. A measure of expected or observed power dissipation by the power unit can correspond to oscillation-control provided by the control unit, a measure of expected or observed diaphragm movement corresponding to an incoming audio signal, and/or a measure of expected or observed diaphragm movement corresponding to the oscillation control provided by the control unit. As well, power dissipated by the power unit can correspond to a measure of expected or observed power dissipation by a logic component, a measure of expected or observed computational load on the logic component, and/or a measure of data-transfer rate to, from or through the logic component.

As well, a rate at which waste heat is dissipated by the logic component can correspond to a computational or other load on the logic component. And, such loads can be observed or determined during operation of an audio appliance, allowing a temperature of the logic component to be inferred or determined indirectly during operation (as from thermal-resistance information, a known or an assumed reference temperature, and observed loads during operation).

Similar to a power unit, thermal-resistance between a logic component and an environment can correspond to a variety of parameters, including the drive signal, a level of amplification of the drive signal, and/or impedance characteristics of the loudspeaker. Such correspondence can be observed or determined experimentally, and can be stored in a memory, e.g., in a look-up table or as curve-fit data.

Accordingly, a temperature of a logic component incorporated in a given audio appliance can be inferred from thermal-resistance data, a reference temperature in the audio appliance and one or more observations of the drive signal, the level of amplification, and/or impedance characteristics of the loudspeaker. And, a temperature of a logic component can be indicated from, e.g., output from a temperature sensor, a measure of expected or observed power dissipation by the power unit (as when there is a thermal coupling between the power unit and a logic component), a measure of expected or observed power dissipation by the logic component, a measure of expected or observed diaphragm movement corresponding to an audio signal received by the control unit, a measure of expected or observed diaphragm movement corresponding to the oscillation control provided by the control unit, a measure of a computational load on the logic component, and/or a measure of data-transfer rate to, from or through the logic component.

V. OSCILLATION CONTROL

Referring now to FIG. 7, an example of control logic is described. The illustrated control logic 50 can receive an indication of temperature of a logic component, an indication of temperature of a power unit, or both. For example, a control unit 52 can receive an indication of temperature for each of one or more heat-dissipation units. Responsive to the one or more indications of temperature, the control unit 52 can provide an output 54 to control an oscillatable diaphragm, as to augment cooling of a heat-dissipation unit or otherwise to maintain a temperature of the heat-dissipation unit below a threshold temperature.

An output 54 from the control unit 52 can be received by a low-frequency oscillator 56. The low-frequency oscillator (LFO) 56 can output a signal 58 to drive the diaphragm in correspondence with the output from the control unit to provide a cooling airflow to one or more heat dissipation units. The drive signal 58 from the LFO 56 can be combined with an audio signal 59 to drive the diaphragm 13 to provide an acoustic output.

Figure 8:
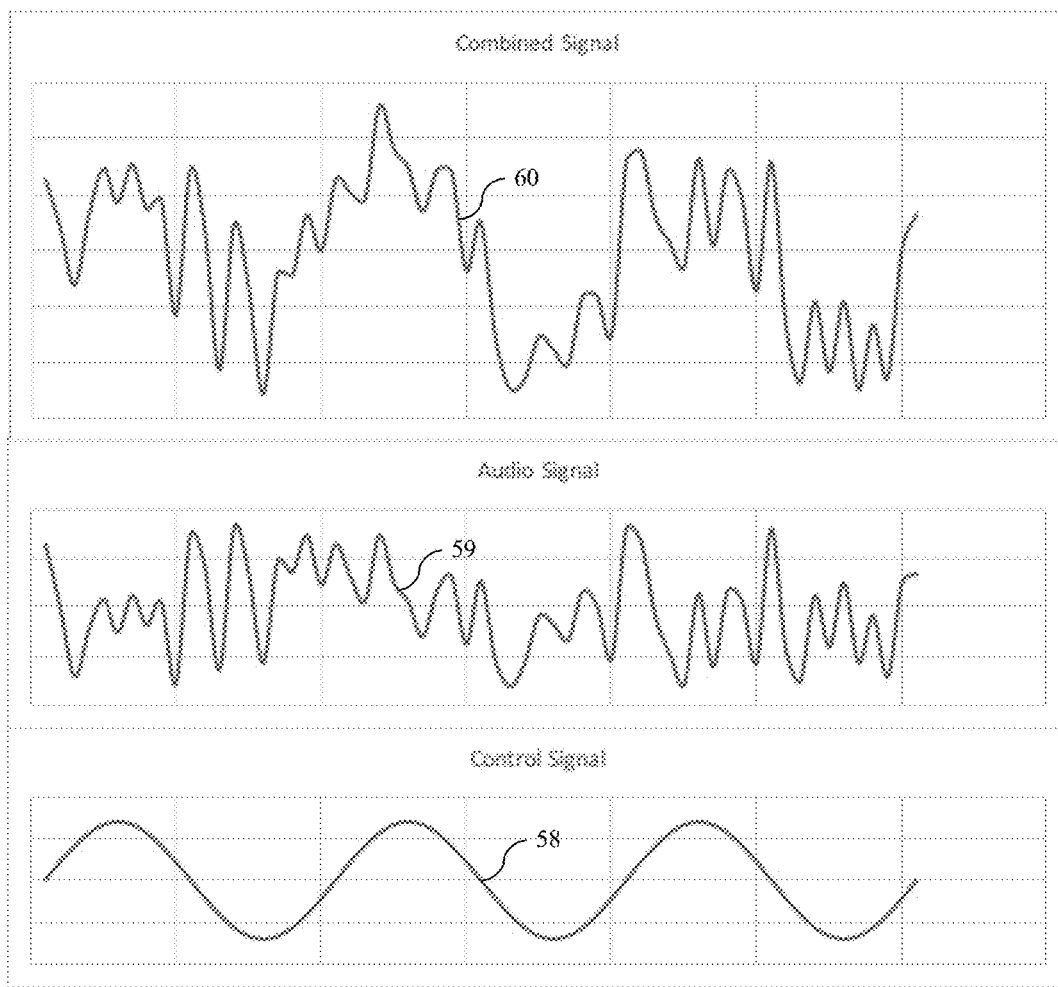
FIG. 8 shows a representative drive-signal from control logic of the type shown in FIG. 7, together with constituent audio and cooling components of the signal.

For example, if a temperature of an amplifier or a temperature of a logic component 16 approaches a threshold temperature during audio playback, the control-unit output 54 can cause the LFO 56 to output a low-frequency cooling signal 58, which can be combined with a desired audio signal 59. The drive signal 58 output by the LFO can be added to or otherwise modulated with the acoustic signal 59, and the combined signal 60 (e.g., cooling drive signal 58 and acoustic signal 59) can drive the transducer diaphragm 13 to oscillate in a selected manner. FIG. 8 shows an example of such a combined signal. The combined signal 60 can induce a desired diaphragm oscillation suitable for augmenting airflow 30a, 30b adjacent a heat-dissipation unit 16, 18 without necessarily disrupting or impairing playback of the desired audio signal 59. For example, an oscillation frequency of the diaphragm 13 can be selectively increased or decreased independently of a selective increase or decrease in amplitude.

Oscillations of the diaphragm 13 can augment fluid movement adjacent one or more heat-dissipation units concurrently with or independently of audio playback. As one example, if a logic component is active and the audio appliance is not playing any audio, the control output 58 can cause the diaphragm 13 to oscillate in a sub-acoustic frequency band through excursions of a selected amplitude to augment cooling of the logic component 16 and/or the power unit. In a different circumstance, the control unit 52 can introduce additional frequency and/or amplitude components to movement of the diaphragm 13 during audio playback.

Thus, sub-acoustic oscillations of the diaphragm 13 can be superimposed on or modulated with an audio signal 59 to provide combined audio playback and relatively increased cooling to one or more heat-dissipation units 16, 18. This can be particularly useful, as when an intended audio playback drives the diaphragm 13 through excursions less than a maximum diaphragm excursion. The sub-acoustic oscillations can be based on a variety of wave forms, e.g., sinusoids, square-waves, etc. That said, the use of non-sinusoids may impart audible harmonics and therefore may be less desirable than sinusoidal cooling signals.

Other measures indicative of a temperature of the logic component and/or the power unit can be used by the control unit 52 to control oscillations of the diaphragm. For example, a computational load and/or a rate of data transfer to or from the logic component can be used to infer a temperature or cooling need for the logic component. Similarly, one or more measures of an audio signal 59 (e.g., frequency, amplitude and gain) can be used to infer a temperature of the power unit 18, as well as to infer a rate of cooling applied to the logic component 16.

For example, driving the diaphragm 13 sufficiently to improve potential convective heat-transfer rates can add to a thermal loading of the audio appliance 10. Accordingly, some disclosed control units 52 can combine observed physical parameters that vary during operation of an audio appliance with prior characterizations of marginal changes in power-dissipation and/or thermal-response to determine whether or to what extent to alter diaphragm oscillations to maintain a unit's 16, 18 temperature below an upper threshold temperature.

In other instances, combining the LFO output 58 with an acoustic signal 59 also might impair playback of a desired audio signal 59. For example, when a desired audio signal 59 drives a diaphragm 13 through large excursions compared to a maximum excursion, modulation of a cooling signal 58 with the audio signal 59 can distort playback of the desired signal and/or reduce a playback level of the audio signal 59. Nonetheless, maintaining a high-degree of performance of a logic component might be more desirable in some instances than maintaining a high level of sound output during playback, and modulating the audio signal with the cooling signal can provide a suitable performance tradeoff. A degree of acceptable audio impairment and a degree of acceptable performance degradation can be user selectable during configuration of some audio appliances.

In some instances, a measure of diaphragm displacement can be used to infer a degree of playback impairment, the power with which the loudspeaker is being driven (or a measure of power-unit heat dissipation), and/or a measure of augmented fluid flow or thermal resistance. A sensor to detect or infer movement of a loudspeaker diaphragm 13 can provide an input 51 to the control unit. In some embodiments, the sensor can be any of a secondary voice coil, a capacitive displacement sensor, a laser displacement sensor, and/or a microphone. In other instances, the input 51 can be a measure of, e.g., woofer level for the loudspeaker transducer 12, as determined from a speaker level output 53a and/or 53b.

The control unit 52 can derive an estimate of temperature from such input and can output a corresponding control signal 54. In determining the output 54, the control unit 52 can take into consideration correspondence of the heat-dissipation unit's temperature to the characteristics to which the unit's rate of heat dissipation corresponds, as well as to an in situ thermal resistance and an indication of an ambient or other reference temperature. Accordingly, for each heat-dissipation component of interest, variation in cooling rate and variation in marginal power dissipation can be characterized in relation to variations in frequency and/or amplitude of sub-acoustic oscillations, alone and concurrently with playback of various audio signals at different levels. As well, effects of any thermal coupling (whether linear or non-linear) between or among heat-dissipation units can be characterized in relation to variations in frequency and/or amplitude of the diaphragm 13 oscillations.

Such characterization data can be stored in a variety of forms (e.g., in a look-up table, as coefficients of a curve fit). A disclosed control unit 52 can combine the characterization data with, for example, an inferred temperature and a woofer level 51 to assess whether or to what extent additional thermal headroom remains for each heat dissipation unit 16, 18. Based on such an assessment, the control unit can issue the output 54.

Some disclosed control units 52 can issue a command signal 54 to indicate that further improvements to cooling rates are unavailable. With such information, an audio appliance 10 can limit power dissipation by one or more heat-dissipation components. For example, a computational or other load applied to each heat-dissipation unit 16, 18 of interest can be maintained below an upper threshold load to maintain each respective rate of heat dissipation below a corresponding upper threshold power. In some instances, the control unit 52 can issue a signal 54 to stop the loudspeaker diaphragm 13 from oscillating, e.g., as a fail-safe mechanism to prevent catastrophic damage to a power unit 18 or other heat-dissipation unit.

Disclosed control units 52 can be embodied in software, firmware or hardware (e.g., an ASIC). In each case, the logic component 16 being cooled by the diaphragm 13 oscillations can form a portion or the entirety of the control unit 52. A control unit processor may be a special purpose processor such as an application specific integrated circuit (ASIC), a general purpose microprocessor, a field-programmable gate array (FPGA), a digital signal controller, or a set of hardware logic structures (e.g., filters, arithmetic logic units, and dedicated state machines), and can be implemented in a general computing environment as described herein.

VI. COMPUTING ENVIRONMENTS

Figure 9:
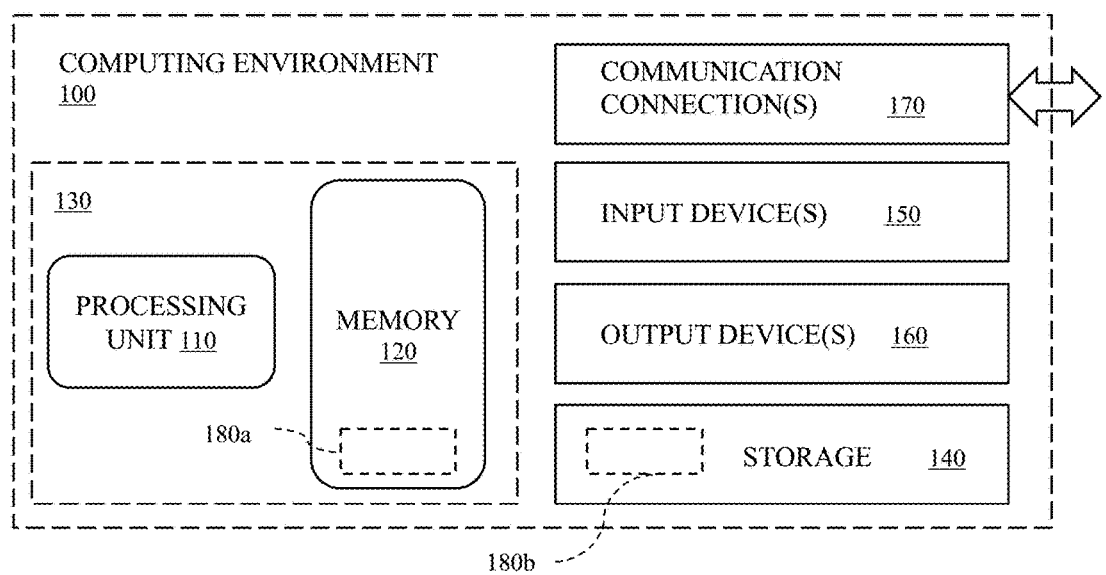
FIG. 9 shows a block diagram of a computing environment suitable for implementing disclosed methods.

FIG. 9 illustrates a generalized example of a suitable computing environment 100 in which described methods, embodiments, techniques, and technologies relating, for example, to maintaining a temperature of a logic component and/or a power unit below a threshold temperature can be implemented. The computing environment 100 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and/or handheld devices (e.g., a mobile-communications device, and more particularly but not exclusively, IPHONE®/IPAD®/HomePod™ devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 100 includes at least one central processing unit 110 and a memory 120. In FIG. 9, this most basic configuration 130 is included within a dashed line. The central processing unit 110 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 110 being represented by a single functional block. A processing unit can include an application specific integrated circuit (ASIC), a general purpose microprocessor, a field-programmable gate array (FPGA), a digital signal controller, or a set of hardware logic structures arranged to process instructions.

The memory 120 may be volatile memory (e.g., registers, cache, RAM), non-volatile memory (e.g., ROM, EEPROM, flash memory, etc.), or some combination of the two. The memory 120 stores software 180a that can, for example, implement one or more of the technologies described herein, when executed by a processor.

A computing environment may have additional features. For example, the computing environment 100 includes storage 140, one or more input devices 150, one or more output devices 160, and one or more communication connections 170. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

The store 140 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 100. The storage 140 can store instructions for the software 180b, which can implement technologies described herein.

The store 140 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 150 may be any one or more of the following: a touch input device, such as a keyboard, keypad, mouse, pen, touchscreen, touch pad, or trackball; a voice input device, such as a microphone transducer, speech-recognition software and processors; a scanning device; or another device, that provides input to the computing environment 100. For audio, the input device(s) 150 may include a microphone or other transducer (e.g., a sound card or similar device that accepts audio input in analog or digital form), or a computer-readable media reader that provides audio samples to the computing environment 100.

The output device(s) 160 may be any one or more of a display, printer, loudspeaker transducer, DVD-writer, or another device that provides output from the computing environment 100.

The communication connection(s) 170 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 100. By way of example, and not limitation, with the computing environment 100, machine-readable media include memory 120, storage 140, communication media (not shown), and combinations of any of the above. Tangible machine-readable (or computer-readable) media exclude transitory signals.

As explained above, some disclosed principles can be embodied in a tangible, non-transitory machine-readable medium (such as microelectronic memory) having stored thereon instructions. The instructions can program one or more data processing components (generically referred to here as a "processor") to perform a processing operations described above, including estimating, computing, calculating, measuring, adjusting, sensing, measuring, filtering, addition, subtraction, inversion, comparisons, and decision making (such as by the control unit 52). In other embodiments, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

For sake of brevity throughout this disclosure, computing-environment components, processors, interconnections, features, devices, and media are generally referred to herein, individually, as a "logic component."

Disclosed computing environments can be embodied in disclosed audio appliances, and are suitable to carry out disclosed techniques and methods to facilitate cooling of audio appliances and their substituent parts, components, and features.

VII. OTHER EMBODIMENTS

The examples described above generally concern apparatus, methods, and related systems to maintain temperatures below acceptable thresholds during operation of an audio appliance. More particularly, but not exclusively, disclosed principles pertain to systems, methods, and components to cool one or more temperature-sensitive areas in an audio appliance. Nonetheless, embodiments other than those described above in detail are contemplated based on the principles disclosed herein, together with any attendant changes in configurations of the respective apparatus described herein.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems to manage temperatures of an audio appliance. For example, the principles described above in connection with any particular example can be combined with the principles described in connection with another example described herein. Accordingly, this detailed description shall not be construed in a limiting sense, and following a review of this disclosure, those of ordinary skill in the art will appreciate the wide variety of thermal-management techniques that can be devised using the various concepts described herein.

The previous description of the disclosed embodiments is provided to enable a person skilled in the art to make or use the disclosed principles. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. An audio appliance, comprising:
   an oscillatable diaphragm, a first heat-dissipation unit, and a second heat-dissipation unit, wherein the first heat-dissipation unit dissipates heat at a first rate and the second heat-dissipation unit dissipates heat at a second rate;
   a control unit to receive an indication of a temperature of the first heat-dissipation unit and an indication of a temperature of the second heat-dissipation unit, the control unit to provide oscillation control of the oscillatable diaphragm to maintain the temperature of the first heat-dissipation unit below a first threshold and/or to maintain the temperature of the second heat-dissipation unit below a second threshold, the control unit to provide the oscillation control responsive to each of the indication of the temperature of the first heat-dissipation unit and the indication of the temperature of the second heat-dissipation unit exceeding a respective threshold.

2. The audio appliance according to claim 1, wherein the first heat-dissipation unit comprises a power unit to provide power to drive the oscillatable diaphragm and the second heat-dissipation unit comprises a logic component.

3. The audio appliance according to claim 2, wherein the indication of the temperature of the first heat-dissipation unit comprises an indication of a temperature of the power unit, wherein the oscillation control provided by the control unit comprises an adjustment to one or both of an oscillation frequency and an oscillation amplitude of the oscillatable diaphragm.

4. The audio appliance according to claim 3, wherein the oscillation control comprises an adjustment to reduce a thermal resistance between the power unit and an adjacent fluid below a threshold thermal resistance.

5. The audio appliance according to claim 3, wherein the oscillation control comprises an adjustment to reduce a power dissipation of the power unit below a threshold power dissipation, thereby to maintain the temperature of the power unit below the first threshold.

6. The audio appliance according to claim 2, wherein the indication of the temperature of the second heat-dissipation unit comprises an indication of a temperature of the logic component, wherein the oscillation control provided by the control unit comprises an adjustment to one or both of an oscillation frequency and an oscillation amplitude of the oscillatable diaphragm.

7. The audio appliance according to claim 6, wherein the oscillation control comprises an adjustment to reduce a thermal resistance between the logic component and an adjacent fluid below a threshold thermal resistance.

8. The audio appliance according to claim 2, wherein the indication of temperature of the power unit comprises an output from a temperature sensor, a measure of expected or observed power dissipation by the power unit corresponding to an audio signal received by the control unit, a measure of expected or observed power dissipation by the power unit corresponding to the oscillation-control provided by the control unit, a measure of expected or observed diaphragm movement corresponding to an incoming audio signal, a measure of expected or observed diaphragm movement corresponding to the oscillation control provided by the control unit, a measure of expected or observed power dissipation by the logic component, a measure of data-transfer rate to, from or through the logic component, a measure of expected or observed computational load on the logic component, or a combination thereof.

9. The audio appliance according to claim 2, wherein the indication of temperature of the logic component comprises an output from a temperature sensor, a measure of expected or observed power dissipation by the power unit, a measure of expected or observed power dissipation by the logic component, a measure of expected or observed diaphragm movement corresponding to an audio signal received by the control unit, a measure of expected or observed diaphragm movement corresponding to the oscillation control provided by the control unit, a measure of data-transfer rate to, from or through the logic component, a measure of a computational load on the logic component, or a combination thereof.

10. The audio appliance according to claim 1, further comprising a low-frequency oscillator, wherein the oscillation control provided by the control unit is received by the low-frequency oscillator, the low-frequency oscillator to output a signal to oscillate the diaphragm at a frequency within a sub-acoustic frequency band and to urge convective fluid movement adjacent the first heat-dissipation unit, the second heat-dissipation unit, or both, responsive to the oscillation control provided by the control unit.

11. The audio appliance according to claim 10, the audio appliance to combine the output signal from the low-frequency oscillator with an audio signal to oscillate the diaphragm at a frequency within an audible frequency band to playback desired audio and to urge convective fluid movement adjacent the first heat-dissipation unit, the second heat-dissipation unit, or both.

12. The audio appliance according to claim 1, further comprising an oscillator to receive one or both of an amplitude output and a frequency output from the control unit, and to output a drive signal to control a flow of fluid adjacent the first heat-dissipation unit, the second heat-dissipation unit, or both.

13. A cooling method for an audio appliance, the method comprising:
    responsive to an indication of a temperature of a first heat-dissipation unit and an indication of a temperature of a second heat-dissipation unit, providing an oscillation-control output to control oscillations of an oscillatable diaphragm;
    oscillating the oscillatable diaphragm in correspondence with the oscillation-control output to urge a fluid to move adjacent the first heat-dissipation unit, the second heat-dissipation unit, or both.

14. The method according to claim 13, wherein the act of oscillating the oscillatable diaphragm comprises oscillating the oscillatable diaphragm within a sub-acoustic frequency band.

15. The method according to claim 13, further comprising combining the oscillation-control output with an audio signal, wherein the act of oscillating the oscillatable diaphragm comprises oscillating the oscillatable diaphragm according to the combined oscillation-control output and audio signal.

16. The method according to claim 15, wherein the oscillation control output comprises an oscillation-control signal having a frequency in a sub-acoustic frequency band, and the act of combining the oscillation control output with the audio signal comprises combining the oscillation-control signal with the audio signal.

17. The method according to claim 13, wherein the oscillation-control output comprises a signal having a frequency in a sub-acoustic frequency range combined with an audio signal, wherein the act of oscillating the oscillatable diaphragm further comprises playback of the audio signal in an audible frequency range.

18. An audio appliance comprising:
    a loudspeaker having a diaphragm;
    a power supply unit to power the loudspeaker; and
    a processor and a memory, wherein the memory stores instructions that, when executed by the processor, cause the audio appliance to drive the diaphragm through an oscillatory movement responsive to an audio signal and to an indication of one or both of a temperature of the processor and a temperature of the power supply unit to urge a fluid to flow past the respective one or both of the processor and the power supply unit.

19. The audio appliance according to claim 18, wherein the oscillatory movement comprises an oscillation component having a frequency between about 5 Hz and about 20 Hz.

20. The audio appliance according to claim 18, wherein the instructions, when executed by the processor, further cause the audio appliance to adjust the oscillatory movement of the diaphragm responsive to an indication of the temperature of the power supply unit exceeding a threshold temperature.

\* \* \* \* \*